United States Patent [19]

Husson et al.

[11] 4,416,352

[45] Nov. 22, 1983

[54] ELEVATOR SYSTEM

[75] Inventors: Alan L. Husson, Hackettstown; Vladimir Uherek, Parsippany, both of N.J.

[73] Assignee: Westinghouse Electric Corp., Pittsburgh, Pa.

[21] Appl. No.: 349,485

[22] Filed: Feb. 17, 1982

[51] Int. Cl.[3] .......................... B66B 1/30; H02P 1/22

[52] U.S. Cl. .......................... 187/29 R; 318/257; 318/293; 363/87

[58] Field of Search .................. 187/29; 318/256, 257, 318/283, 287, 291, 293, 345 E; 363/87

[56] References Cited

U.S. PATENT DOCUMENTS

| | | | |
|---|---|---|---|
| 3,713,011 | 1/1973 | Johnson et al. | 318/257 X |
| 3,713,012 | 1/1973 | Johnson | 318/257 X |
| 3,984,741 | 10/1976 | Kind | 318/293 |
| 4,258,829 | 3/1981 | Johnson | 187/29 |
| 4,277,825 | 7/1981 | Johnson | 318/257 X |
| 4,286,315 | 8/1981 | Johnson | 363/87 |

*Primary Examiner*—J. V. Truhe
*Assistant Examiner*—W. E. Duncanson, Jr.
*Attorney, Agent, or Firm*—D. R. Lackey

[57] ABSTRACT

An elevator system including an elevator car and a drive machine having a DC drive motor, a dual converter, and a phase controller for providing gate drive signals for the dual converter. A reference signal relates to the desired motor armature current is developed in response to the operation of the elevator system. The reference signal indicates when the current source should be switched from one converter bank to the other converter bank. The switching is accomplished by a method which includes retarding the firing angle of the gate drive signals applied to the operative converter, until current is extinguished, applying the gate drive signals to the other converter bank, and advancing the firing angle towards rectification to initiate current flow in the on-coming converter. The rate at which the firing angle is advanced towards rectification is a function of the control signal.

6 Claims, 6 Drawing Figures

ELEVATOR SYSTEM

BACKGROUND OF THE INVENTION

1. Field of the Invention

The invention relates in general to elevator systems, and more specifically to new and improved methods and apparatus for elevator systems whose drive machines include a DC motor powered by a dual converter power supply.

2. Description of the Prior Art

Elevator systems of the traction type include an elevator car connected to a counterweight via a plurality of steel ropes reeved over a drive or traction sheave. The drive sheave is commonly driven by a DC motor whose power source is a solid state dual converter. The dual converter includes two converters, each of which includes a plurality of controlled rectifier devices, connected and gated to exchange electrical energy between alternating and direct current circuits. One converter is connected such that when operative it provides armature current in one direction, and the other converter is connected such that, when operative, it provides armature current in the opposite direction. An error or reference control signal developed in response to the actual performance of the elevator system versus the desired response, selects which converter bank should be operative, and the magnitude of the armature current to be supplied by the operative converter.

It is common during the operation of the elevator system for the error signal to require the torque output of the drive motor to be quickly reversed. Converter bank switching is accomplished by retarding the firing angle of the gate drive pulses applied to the operative converter to a limit called the inversion end stop, to insure that current is extinguished in the operative converter bank. When current is extinguished, the other converter bank is enabled and the firing angle of the gate drive pulses applied to this converter is advanced towards rectification to develop armature current from the oncoming converter bank.

When torque must be quickly reversed, it is important that bank switching be accomplished as quickly as possible, to reduce the "dead time" during which the converter is not following the error or reference signal. Thus, in order to speed up the process of moving the firing angle back towards rectification, a bank switching "pull-through" bias is injected into the current control loopfrom the time the new converter bank is enabled until the start of current flow from the new converter bank.

While the injection of the "pull-through" bias during bank switching helps to speed up the bank switching process, it also presents a problem under balanced load conditions, i.e., when the weight of the elevator car and its load is close to the weight of the counterweight. When the elevator car carries a balanced load at constant speed, the armature current is close to zero. Only small changes in current are required to overcome disturbances caused by areas of higher or lower than normal friction in the hoistway, or to overcome slight imbalances in compensation. Because the "pull-through" bias causes the firing angle to advance by larger than normal steps, there is a tendency to overstep the required firing angle when the current to be supplied by the new bank is close to zero. When this happens, a "bump" of current of 5–10 amperes may occur as conduction begins. This "bump" tends to set off oscillations in the highly resonant elevator system, commonly called bank-switching jitter. The current "bump" also tends to accelerate the elevator car more than the desired amount, resulting in an immediate need to decelerate the car by switching back to the other converter bank. The process may then repeat again. If the current bumps continue, the oscillations in the elevator car may build up to the point where the ride quality is deleteriously affected.

SUMMARY OF THE INVENTION

Briefly, the present invention is a new and improved elevator system which eliminates bank switching jitter, without sacrificing bank switching speed when rapid torque reversal is required. The new elevator system, in effect, anticipates the magnitude of the initial current to be supplied by the on-coming converter, and it automatically selects the rate at which the firing angle is to be advanced. If the on-coming converter is to supply a current magnitude which exceeds a predetermined value, the pull-through bias is applied, and the system selects an accelerated rate for advancing the firing angle towards the rectification end stop. If the on-coming converter is to initially supply a current which is less than this predetermined magnitude, the pull-through bias is not applied, and the firing angle is advanced at a second rate, which is less than the first rate. Thus, when the actual current requirement is hovering near zero, any bank switching will take place without overstepping the required firing angle of the gate drive pulses applied to the on-coming converter, eliminating the current "bump" which initiates oscillations and undesirable acceleration of the car.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF THE PREFERRED EMBODIMENT

Figure 1:
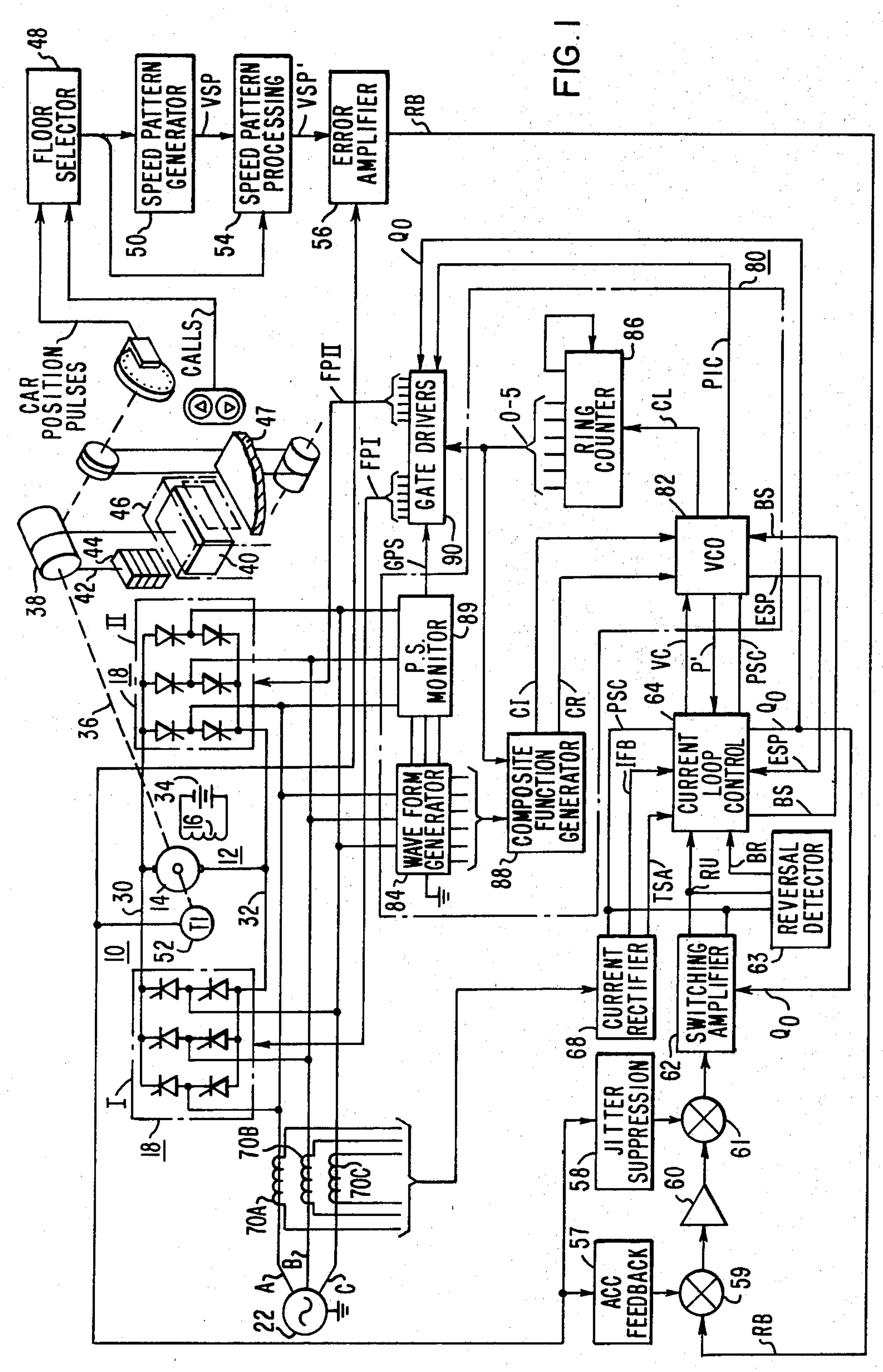
FIG. 1 is a schematic diagram of an elevator system constructed according to the teachings of the invention.

Referring now to the drawings, and to FIG. 1 in particular, there is shown an elevator system 10 constructed according to the teachings of the invention.

Elevator system 10 is of the traction type, having a direct current drive motor 12 which includes an armature 14 and a field winding 16. Armature 14 is electrically connected to an adjustable source of direct current potential, which is in the form of a dual converter 18. Dual converter 18 includes first and second converter banks I and II, which may be three-phase, full-wave bridge rectifiers connected in parallel opposition. Each converter bank includes a plurality of static, controlled rectifier devices connected to interchange electrical energy between alternating and direct current circuits. The alternating current circuit includes a source 22 of alternating potential and line conductors A, B and C. The direct current circuit includes buses 30 and 32, to which the armature 14 of the DC motor is connected. The dual bridge converter 18 enables the magnitude of the current flowing through armature 14 to be adjusted, by controlling the conduction or firing angle of the gate drive pulses applied to the controlled rectifier devices, and it allows the direction of the current flow through the armature to be reversed, when desired, by selectively operating the converter banks. When converter bank I is operational, current flow in the armature 14 is from bus 30 to bus 32, and when converter bank II is operative, the current flow is from bus 32 to bus 30.

The field winding 16 of DC motor 14 is connected to a source 34 of direct current voltage, represented by a battery in FIG. 1, but any suitable source, such as a single bridge converter, may be used.

The DC drive motor 12 includes a drive shaft, indicated generally by broken line 36, to which a traction or drive sheave 38 is attached. An elevator car 40 is supported by wire ropes 42 which are reeved over the traction sheave 38. the other ends of the ropes are connected to a counterweight 44. The elevator car 40 is disposed in a hatch or hoistway 46 of a building having a plurality of floors or landings, such as floor 47, which floors are served by the elevator car 40.

The movement mode of the elevator car 40, and its position in the hoistway 46, are controlled by a floor selector 48. The magnitude and polarity of the DC voltage applied to armature 14 is responsive to a velocity command signal VSP provided by a speed pattern generator 50. The speed pattern generator 50 provides a speed pattern signal VSP in response to a signal from the floor selector 48. A suitable floor selector and speed pattern generator which may be used are shown in U.S. Pat. No. 3,750,850, which is assigned to the same assignee as the present application.

A suitable control loop for controlling the speed, and the position of the elevator car 40 in the hoistway 46, in response to the velocity command signal VSP includes a tachogenerator 52 which provides a signal responsive to the actual speed of the elevator car 40. The speed pattern signal VSP is processed in a processing function 54, such as disclosed in U.S. Pat. No. 4,258,829, which is assigned to the same assignee as the present application. The processed speed pattern VSP' is compared with the actual speed signal from tachogenerator 52 in an error amplifier, such as disclosed in U.S. Pat. Nos. 3,731,011 and 3,713,012, which are assigned to the same assignee as the present application.

The output of error signal RB from error amplifier 56 is compensated and amplified at various summing points, such as by an acceleration feedback signal developed by acceleration feedback means 57, and a signal for suppressing certain oscillations or jitter, which signal may be developed by jitter suppression feedback means 58. U.S. Pat. Nos. 3,749,204 and 4,030,570 disclose acceleration and jitter suppression circuits, respectively, which may be used for these functions. The error signal RB and the acceleration feedback signal from function 57 are summed at summing point 59 and amplified by amplifier 60, such as an operational amplifier connected in a summing configuration. Motor armature feedback, not shown, may also be applied to summing point 59.

The output of amplifier 60 is connected to a summing point 61, as is the jitter suppression signal provided by means 58, and the summed signals are applied to a switching amplifier 62. A suitable switching amplifier configuration which may be used for function 62 is disclosed in the hereinbefore mentioned U.S. Pat. No. 3,713,011, and this patent is hereby incorporated into the specification of the present application by reference. Signal RB, after compensation, serves as a current reference for the operation of the dual converter 18, with the motor armature 14 being the load. The function of the switching amplifier 62 is to provide a substantially unidirectional reference signal RU in response to the bidirectional, compensated error signal RB. Converter bank selection is responsive to the logic level of a signal $Q_0$, and the logic level of this signal is used to select a transfer function of $+1$, or $-1$, for the switching amplifier 62. As will be hereinafter described, the signal RU, in certain instances, may cross zero and attain a predetermined maximum negative value, before the switching amplifier 62 changes its transfer function to return to the polarity of its substantially unidirectional output signal.

The converter apparatus is operated in a closed current loop mode, using current feedback to operate the dual converter essentially as a current amplifier. The current comparison circuit includes the switching amplifier 62 which converts the compensated signal RB into a substantially unidirectional signal RU, a reversal detector 63 responsive to control signal RU, current loop control 64 which includes an error amplifier, and a current rectifier 68. Current transformers 70A, 70B and 70C provide signals responsive to the current flowing in line conductors A, B and C to the operational converter bank, and the current rectifier 68 provides unidirectional signals TSA and IFB responsive to the line currents. Conductor PSC is the power supply common.

Unidirectional current feedback signals IFB and TSA are proportional to the magnitude of the current flowing through the load circuit, regardless of the direction of the current flowing through the load circuit or armature 14.

The unidirectional reference signal RU and the unidirectional feedback signal TSA are compared in the error amplifier of the current loop control 64, as will be hereinafter explained, and an error signal VC is developed which has a magnitude and polarity responsive to the difference between these two signals.

The error signal VC is applied to a phase controller 80 which provides firing pulses FPI and FPII for converter banks 18I and 18II, respectively. The firing pulses control the conduction angle of the controlled rectifier devices in response to the error signal VC. Bank reversal, and therefore selection of which converter bank should be operational, is responsive to the logic level of signal $Q_0$.

In order to maintain synchronism between the phase controller 80 and the dual converter 18, the conduction angle is maintained between predetermined limits or end stops, which are referred to as rectification and inversion end stops. A signal ESP is provided by the phase controller 80 when the inversion end stop is reached, which signal is applied to the current control loop 64. Current control loop 64 provides a signal BS which, when a logic zero, forces the phase controller 80 to the inversion end stop condition.

Phase controller 80 includes a voltage controlled oscillator or VCO 82, a waveform generator 84, a ring counter 86, a composite function generator 88, and a power supply monitor 89. The output of the phase controller 80 is applied to gate drivers 90, which in turn provide the firing pulses FPI, or FPII, depending upon which bank is operational. Gate drivers 90 may be constructed as disclosed in the hereinbefore mentioned U.S. Pat. No. 3,713,011, or in U.S. Pat. No. 4,286,315, which is assigned to the same assignee as the present application. U.S. Pat. No. 4,277,825 discloses circuitry which may be used for the VCO 82, ring counter 86, and the composite function generator 88. U.S. Pat. No. 4,286,222 discloses circuitry which may be used for the waveform generator 84 and the power supply monitor 89. These patents, which are all assigned to the same assignee as the present application, are hereby incorporated into the specification of the present application by reference.

The present invention anticipates whether or not the current to be initially supplied by an on-coming converter, after the current in the other converter bank has been extinguished, will be minimal, i.e., close to zero, or more substantial. If the current reference is hovering around zero, and changing slowly, such as when the elevator car is operating with a substantially balanced load at constant speed, the VCO 82 will retard the firing angle as the reference signal VC goes closer and closer to zero, and it will finally reach the inversion end stop shortly after signal VC goes through zero. When the inversion end stop is reached, a signal ESP is provided. The other converter bank should then be made operational, but its initial current requirement will be close to zero, and it will remain low during the constant speed portion of the run.

If the current requirement to be supplied by the on-coming converter bank will be more substantial, i.e., a fast torque change is required, the current reference signal RU will be changing quickly, and as the current reference RU crosses through zero, the actual current TSA lags behind. Under these conditions, the current reference RU will reach a predetermined negative threshold before the VCO reaches the inversion end stop.

The invention includes a new and improved method of switching from one converter bank to the other converter bank in the dual converter motor drive system for an elevator system by providing a control signal RU indicative of the desired motor current, by detecting the need to change converters in response to said control signal RU, by extinguishing the current in the operative converter in response to the detection step, by applying the gate drive pulses to the other converter, and then by advancing the firing angle of the gate drive pulses towards rectification at a rate which is dependent upon the control signal.

More specifically, the reversal detection function 63 shown in FIG. 1, detects when a predetermined threshold is crossed by signal RU, and it provides a signal BR upon this occurrence. The threshold is adjustable from a slightly positive value to a predetermined negative value, with the threshold being set to a negative value in a preferred embodiment of the invention. Signal BR, when provided by reversal detection function 63, is applied to the current control loop 64, and when the current in the operational converter bank is extinguished, current loop control 64 provides a signal BS for VCO 82 which forces VCO 82 to the inversion end stop.

In this exemplary embodiment of the invention, means is provided which is responsive to control signal RU by distinguishing between two different causes of converter bank switching, which causes are responsive to signal RU. The first cause is switching due to reversal detector 63 providing a signal BR whose logic level indicates signal RU has reached the predetermined threshold, and the second cause of converter bank switching is due to the generation of signal ESP by VCO 82, without being forced by a signal BS from the current loop control 64.

Figure 2:
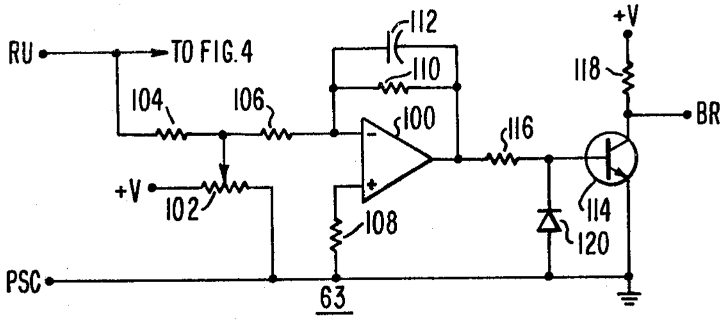
FIG. 2 is a detailed schematic diagram of a circuit which may be used for a function shown in block form in FIG. 1, which function detects when bank switching is required with a pull-through bias.

FIG. 2 is a schematic diagram of a reversal detector which may be used for the reversal detector function 63 shown in block form in FIG. 1. The reversal detector 63 includes an operational amplifier (OPAMP) 100 connected to detect when signal RU drops to the predetermined threshold value. In a preferred embodiment, this predetermined value is in the range of about +0.08 V to −0.07 V, as selected by adjustable resistor 102, with a preferred value being about 31 0.04 V. Signal RU is applied to the inverting input of OPAMP 100 via resistors 104 and 106, and the junction between these resistors is connected to the power supply common PSC via one end of the adjustable resistor 102. The other end of adjustable resistor 102 is connected to a positive source of unidirectional potential. The non-inverting input of OPAMP 100 is connected to PSC via a resistor 108. A feedback resistor 110, and a capacitor 112 connected across the feedback resistor 110, complete the comparator configuration of OPAMP 100. The output of OPAMP 100 is normally negative. As signal RU drops towards zero and crosses the predetermined threshold value, preferably a slightly negative voltage, the output of OPAMP 100 switches positive. An NPN transistor 114 is used to signify the reaching of the predetermined threshold. The output of OPAMP 100 is applied to the base of transistor 114 via a resistor 116, the collector is connected to a positive source of unidirectional voltage via a resistor 118, and also to an output terminal BR. The emitter of transistor 114 is connected to PSC, and a diode 120 is connected from the emitter to the base, with the anode of diode 120 being connected to the emitter. Thus, when signal RU is above the predetermined threshold, the negative output of OPAMP 100 maintains transistor 114 in a cut-off state, and signal BR is at the positive level of the unidirectional supply voltage. When signal RU drops to the threshold value, the output of OPAMP 100 switches positive, transistor 114 is turned on, and the output terminal BR goes to the logic zero level of conductor PSC. Thus, when signal BR goes to the logic zero level, it indicates bank switching is required.

Figure 3:
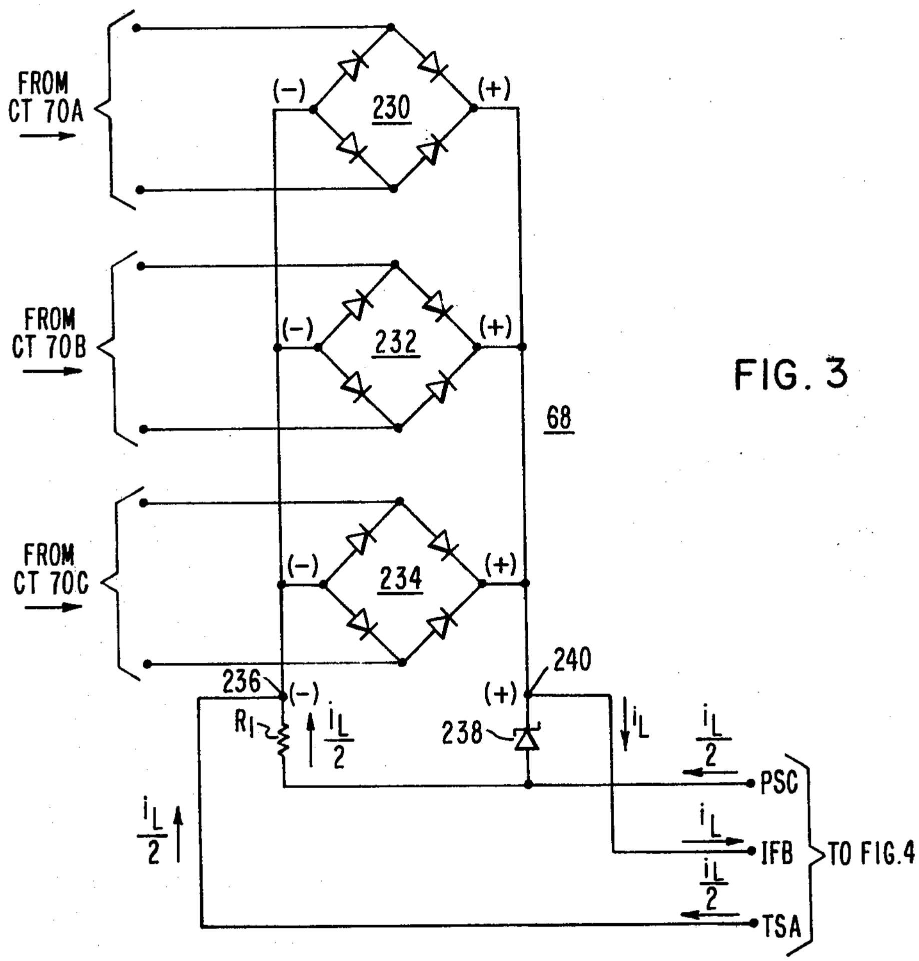
FIG. 3 is a detailed schematic diagram of a circuit which may be used for a function shown in block form in FIG. 1, which function provides certain signals in response to converter bank current.

FIG. 3 is a schematic diagram of a circuit which may be used to provide the current rectifier function 68 shown in FIG. 1. Single-phase, full-wave bridge rectifiers 230, 232 and 234 rectify the outputs of current transformers 70A, 70B and 70C, respectively, and their outputs are added together to produce a current $i_L$. Current $i_L$ is thus directly proportional to the load current of the operative converter. A resistor $R_1$ is connected from the negative output terminal 236 of the rectifiers to PSC, and a zener diode 238 is connected from the positive output terminal 240 of the rectifiers to PSC. During normal operation negligible current flows through diode 238. Its purpose is to provide an alternate path for $i_L$ in the event the continuity of the circuit to which current rectifier 68 is connected is broken. Resistor $R_1$, in combination with a resistor $R_1'$ of like value in current loop control 62, causes a division of $i_L$ to provide the load current feedback signals IFB and TSA.

Figure 4:
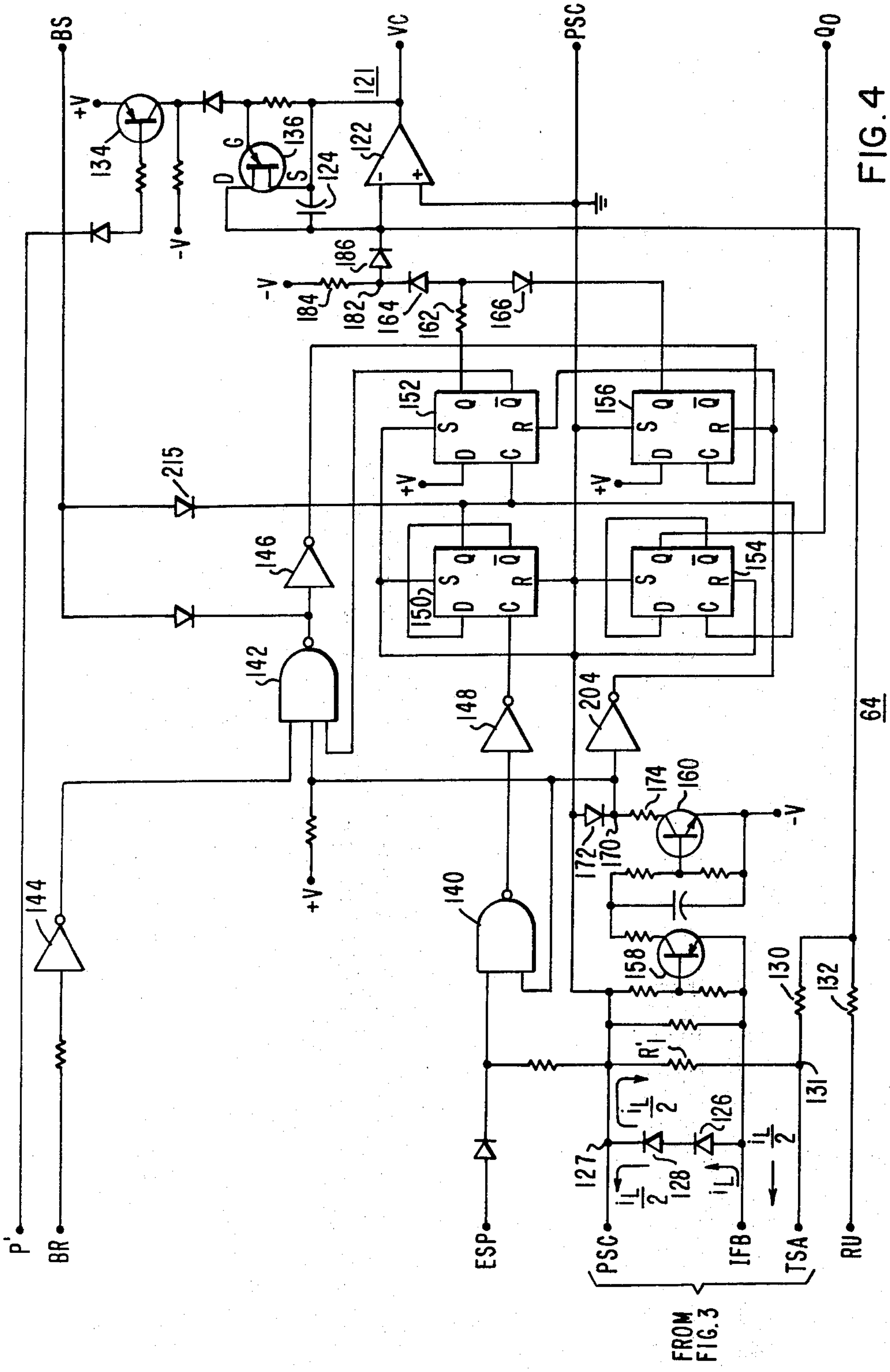
FIG. 4 is a detailed schematic diagram of a circuit which may be used for another function shown in block form in FIG. 1, for logically relating the signal from the circuit of FIG. 2 with other system signals, in order to properly enable and disable the "pull-through" bias.

FIG. 4 is a schematic diagram of a circuit which may be used for the current loop control function 64 shown in block form in FIG. 1. Current loop control function 64 includes an error amplifier 121, which may include an OPAMP 122. The error amplifier 121 compares the unidirectional current reference signal RU with the unidirectional signal TSA responsive to the actual converter current. Error amplifier 121 provides an output signal VC which controls the firing angle of the gate drive pulses applied to the operative converter bank, to provide the desired armature current in motor armature 18.

The error amplifier 121 is connected as an integrator, having a feedback capacitor 124. The rectified current signal $i_L$ from the current rectifier 68 flows through diodes 126 and 128, and it divides at junction 127 to flow through resistor $R_1$ in FIG. 3 and through a resistor $R_1'$ in FIG. 4, to provide a voltage across resistor $R_1'$, at terminal 131, proportional to load current. The voltage at terminal 131, and the unidirectional signal RU, which has a polarity opposite to the polarity of the voltage across resistor $R_1'$, are summed by summing resistors 130 and 132 and integrated by error amplifier 121. Thus, the output signal VC is proportional to the integral of the difference between the desired motor armature current, represented by signal RU, and the actual motor armature current, represented by the signals IFB and TSA.

Each time a thyristor or controlled rectifier device in one of the power converter banks is gated "on", a short duration pulse (about 25 μs) is produced at input terminal P'. These pulses may be provided by the $\overline{Q}$ output of the monostable 110 of VCO 82 shown in FIG. 2 of incorporated U.S. Pat. No. 4,277,825. This negative pulse is applied to a PNP transistor 134, which is turned on, and this brief conduction of transistor 134 briefly gates a switching device 136 connected across the feedback capacitor 124 of the integrating error amplifier 121. The switching device 136, which may be a FET, as illustrated, discharges capacitor 124 and resets VC to zero, 360 times per second, to effectively eliminate the 1/s transfer function of this stage, while retaining an integrating characteristic between the reset pulses.

Figure 6:
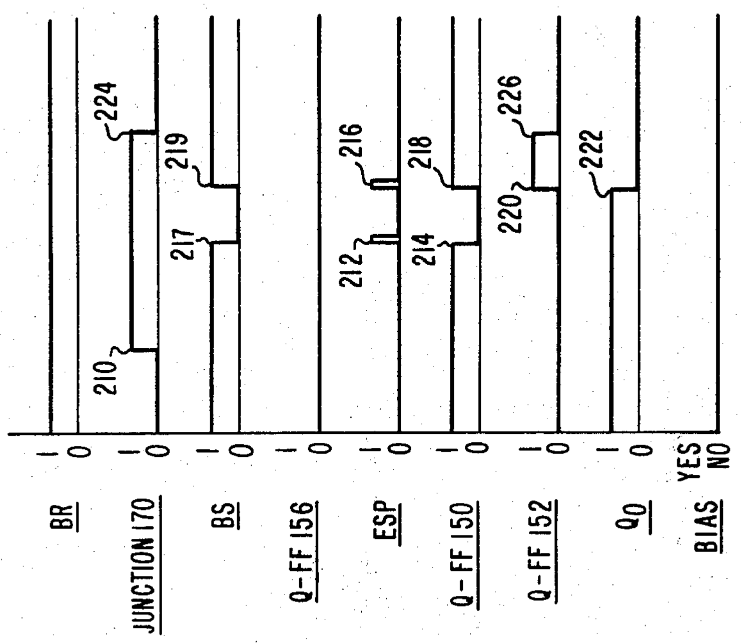
FIG. 6 is a timing diagram which illustrates the system signals shown in FIG. 5 when the bank switching is accomplished without "pull-through" bias.
Figure 5:
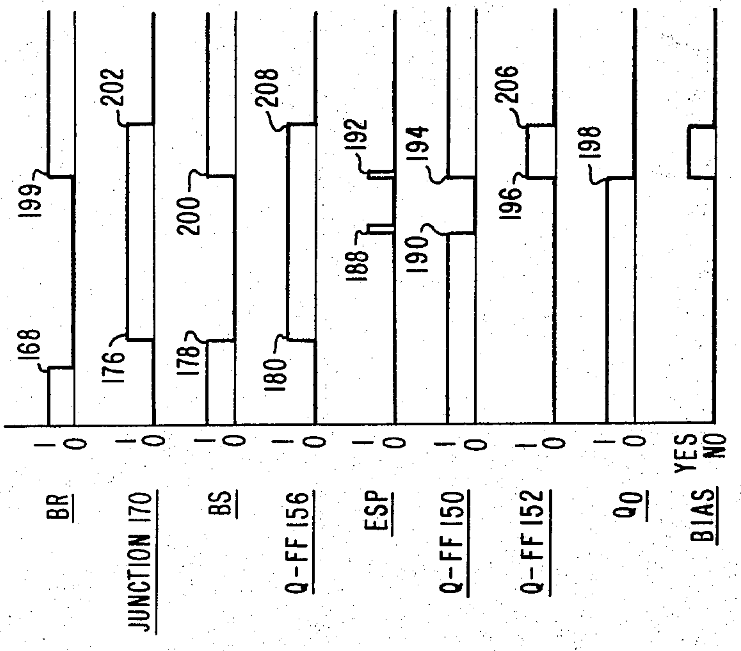
FIG. 5 is a timing diagram which illustrates certain system signals when bank switching is accomplished with "pull-through" bias.

Load current reversal through armature 14 is initiated in response to the detection that (1) current reversal is desired, and (2) the load current in the presently operating converter has ceased. When these two facts occur, the present invention discriminates between the different causes of item (1), and it sets up the circuitry to select the proper speed for carrying out the reversal of the armature or load current. The logic for this discriminatory function includes NAND gates 140 and 142, inverter gates 144, 146 and 148, and "D"-type flip-flops 150, 152, 154 and 156. The circuitry for detecting the extinction of load current includes PNP transistor 158 and NPN transistor 160. The circuitry for selection of bank switching speed includes resistor 162 and diodes 164 and 166. FIG. 5 and 6 are timing diagrams which illustrate various signals during the operation of the current loop control function 64 for the two different causes of bank reversal, and they will be referred to during the following description of the operation of the current loop control 64.

It will first be assumed that rapid torque reversal is required by the elevator system 10, and thus signal RU will be rapidly changing and it will reach the threshold voltage which triggers BR, as described relative to FIG. 2. The timing diagram of FIG. 5 is pertinent to this situation. When the bank reversal threshold trigger is reached by the rapidly changing signal RU, signal BR goes to a logic zero, as shown at 168 in FIG. 5. Base drive current for transistor 158 is responsive to the load current signal IFB, i.e., the voltage drop across diodes 126 and 128 produced by signal $i_L$. When signal IFB drops to a predetermined small value, transistor 158 stops conducting, and if transistor 158 remains non-conductive for about 1 ms, transistor 160 stops conducting and the voltage at the junction 170 between a diode 172 and a resistor 174, which are serially connected from PSC to the collector of transistor 160, goes from the logic zero level to the logic one level, as shown at 176 in FIG. 5. NAND gate 142, which is responsive to signal BR via inverter gate 144, the logic level of junction 170, and the $\overline{Q}$ output of flip-flop 152, now has all logic one input signals and its output goes low, as shown at 178. Output signal BS thus goes low to force VCO 82 towards the inversion end stop condition, to insure that load current is extinguished in the operative converter. When the output of NAND gate 142 goes low, inverter gate 146 applies a logic one signal to flip-flop 156, to clock flip-flop 156 and cause its Q output to switch to the logic one level, as shown at 180 in FIG. 5. This "enables" the pull-through bias for increasing the speed of current reversal, with the pull-through bias being provided by the Q output of flip-flop 152, resistor 162, and diode 164. Diode 164 is connected to the junction 182 between a resistor 184 and the anode electrode of a diode 186. The other end of resistor 184 is connected to a source of negative unidirectional potential, and the cathode electrode of diode 186 is connected to the inverting input of OPAMP 122. When the Q output of flip-flop 156 is low, it ties the anode of diode 164 to logic zero, and thus the pull-though bias cannot be applied. When the Q output of flip-flop 156 is high, it enables the pull-through bias feature.

When signal BS goes to logic zero, the inversion end stop condition of VCO 82 will be reached within one-third of a power frequency cycle, and VCO 82 provides an end stop pulse signal ESP, as shown at 188 in FIG. 5. NAND gate 14, which is responsive to ESP and to the logic level of junction 170, now has two logic one input signals, and its output switches to logic zero. Inverter gate 148 inverts the low output of NAND gate 140 and clocks flip-flop 150, causing its Q output to go to logic zero, as shown at 190. A second ESP pulse 192 occurs one sixth of a power frequency cycle after the first pulse 188, which causes flip-flop 150 to be clocked again, such that its Q output is a logic one, as illustrated at 194. This logic one at the Q output of flip-flop 150 serves as a clock signal for flip-flops 152 and 154. Thus, the Q output of flip-flop 152 goes to a logic one level, as shown at 196, applying a "pull-through" bias to the error ampifier 121. Also, the Q output of flip-flop 154 goes low, as shown at 198, which causes signal $Q_0$ to go to a logic zero and initiate the switching of gate drive signals from one converter bank to the other. When signal $Q_0$ goes to logic zero, the switching amplifier 62 switches signal RU positive, and signal BR goes to a logic one, as shown at 199. When flip-flop 152 is clocked, its $\overline{Q}$ output goes to a logic zero, driving the output of NAND gate 142 and thus signal BS to a logic one, as shown at 200, to release the forcing of the firing angle of the phase controller 80 to the inversion end stop. The "pull-through" bias produces a negative output signal VC, causing VCO 82 to rapidly advance away from the inversion end stop towards the rectification end stop, to speed up the process of establishing current flow in the on-coming converter bank. As soon as the firing angle has advanced sufficiently to cause armature current to flow in armature 18, transistors 158 and 160 will conduct and junction 170 will go to the logic zero level, as shown at 202, resetting flip-flops 152 and 156 via an inverter gate 204. Thus, the "pull-through" bias terminates at 206, simultaneously with the termination of the "bias enable" at 208.

Now, it will be assumed that the switching of the converter banks has been caused by signal RU gradually going through zero without reading the threshold level which triggers a low signal BR. The timing diagram of FIG. 6 applies to this operation of the current loop control 64. As signal RU approaches zero, the phase controller 80 will attempt to follow it by retarding the firing angle of the gate drive pulses. Transistors 158 and 160 will detect when the current is substantially zero, causing junction 170 to go to a logic one level, as shown at 210 of FIG. 6, and the firing angle will continue to be retarded until the inversion end stop condition is reached. When the inversion end stop is reached, an ESP pulse is provided by VCO 82, as shown at 212 of FIG. 5.

When the ESP pulse 212 is provided, NAND gate 140 and inverter 148 clock flip-flop 150, causing its Q output to go to logic zero, as shown at 214. This forces BS to logic zero through diode 215, as shown at 217 in FIG. 6. This insures that one sixth of a power cycle later a second ESP pulse 216 is provided. The second ESP pulse 216 clocks flip-flop 150, and the Q output of flip-flop 150 goes to a logic one, as shown at 218. When the Q output of flip-flop 150 goes to a logic one at 218, signal BS goes back to a logic one at 219, and flip-flops 152 and 154 are clocked, causing the Q output of flip-flop 152 to go to a logic one level, as shown at 220, and the Q output of flip-flop 154 to go to the logic zero level, as shown at 222. Thus, signal $Q_0$ goes low at 222 to change the gate drive from one converter bank to the other. The high Q output of flip-flop 152, however, applies no "pull-through" bias to the error amplifier 121, as the bias enable has not been provided by flip-flop 156. Flip-flop 156 has not been clocked during this process, and its Q output remains low throughout the entire bank switching process, tying junction 182 to the logic zero level. Thus, bank switching occurs, but the firing angle is not forced back toward the rectification end stop with the speed at which it is advanced in the first example. The initial current in the on-coming converter will thus not appear as a relatively large "bump", and oscillation of the elevator system 10 during bank switching is not produced. Further, no undue acceleration of the elevator car is caused, thus making it unnecessary for the control to immediately initiate bank switching to provide an off-setting deceleration. When current is established in the on-coming converter, transistor 160 will conduct, junction 170 goes to the logic zero level, as shown at 224 and flip-flop 152 is reset, as shown at 226.

In this second example of bank switching, should signal BR go to the logic zero level at any time between when bank switching is initiated at 212 and when bank switching has been completed at 224, flip-flop 156 will be clocked to enable the "pull-through" bias to be applied to the error amplifier 121.

In summary, there has been disclosed a new and improved elevator system which includes a new and improved methods and apparatus for accomplishing current reversal in the DC drive motor of an elevator system. The elevator system includes a dual solid state converter, and control for selecting a converter bank switching speed which is responsive to the actual needs of the elevator system at the instant of switching. The actual need of the elevator system at this instant is determined by control signal RU. When signal RU is changing quickly and it reaches a predetermined threshold magnitude, it indicates that quick torque reversal is desired, and the error amplifier 121 is biased during the switching process to reduce the time between the extinction of load current in one converter bank, and the start of load current in the on-coming bank. When control signal RU goes through zero, but it does not reach the predetermined threshold, a quick torque reversal is not required and, in fact, is undesirable. In this instance, the invention accomplished bank switching without any added or pull-through bias.

We claim as our invention:

1. An elevator system including an elevator car driven by a DC drive motor energized by dual converter means which switches from one converter bank to the other in response to a reference signal by retarding the firing angle of the gate drive pulses applied to the operative converter bank to a predetermined inversion end stop, applying the gate drive pulses to the other converter bank, and advancing the firing angle thereof back towards rectification, the improvement comprising:

means responsive to the reference signal for selecting the rate, from at least first and second different rates, at which the firing angle of the gate drive pulses is advanced back towards rectification.

2. The elevator system of claim 1 including at least first and second different means responsive to the reference signal for initiating the switching of the converter banks, with the rate selection means being responsive to the reference signal via said first and second different means.

3. The elevator system of claim 2 wherein the first and second means initiate converter switching according to the parameter of the reference signal indicative of the magnitude of the current to be initially provided by the on-coming converter, with the second means initiating switching when the on-coming current requirement is less than a predetermined magnitude, and with the first means initiating switching when the current requirement will be greater than said predetermined magnitude, and wherein the rate selection means selects a lower rate when the second means initiates switching, than when the first means initites switching.

4. The elevator system of claim 1 wherein the first means includes means indicating converter bank switching is required when the reference signal drops to a predetermined threshold value, and the second means includes, means indicating converter bank switching is required when the firing angle of the gate drive pulses is retarded to a predetermined inversion end stop value, with the rate selection means selecting the first rate when the first means indicates converter switching is required, and the second rate, which is less than the first rate, when only the second means indicates converter bank switching is required.

5. An elevator system, comprising:

an elevator car, motive means for said elevator car including a DC drive motor having an armature circuit, a load circuit including the armature circuit of said DC drive motor, a source of alternating potential, dual converter means including first and second converter banks each having controlled rectifier devices, said controlled rectifier devices being connected to interchange electrical energy between said source of alternating potential and said load circuit, means providing a control signal indicative of the desired motor armature current, means for providing gate drive signals for the controlled rectifier devices of a selected one of said first and second converter banks, with said gate drive signal having a firing angle responsive to said control signal, within predetermined rectification and inversion end stop restraints, said means including means for switching the gate drive pulses from one converter bank to the other converter bank, in response to said control signal, including means for retarding the firing angle to the inversion end stop to extinguish the current in the operative converter bank, means for switching the gate drive pulses to the other converter bank, and means for advancing the firing angle of the gate drive pulses back towards rectification, and including means responsive to the control signal for controlling the rate at which the firing angle is driven back towards rectification.

6. A method of switching from one converter bank to the other converter bank of a dual converter motor drive system for an elevator car, comprising the steps of:

providing a control signal indicative of the desired motor current, detecting the need to change converter banks in response to said control signal, extinguishing the current in the operative converter bank, in response to the detecting step, by retarding the firing angle of the gate drive pulses applied to the operative converter bank to a predetermined inversion end stop, applying the gate drive pulses to the other converter bank, and advancing the firing angle of the gate drive pulses towards rectification at a rate dependent upon the control signal.

* * * * *